J. Belknap,

Potato Fork.

No. 96,770. Patented Nov. 16, 1869.

Attest: L. B. Banks
A. M. Guthrie

Inventor:
Joseph Belknap

United States Patent Office.

JOSEPH BELKNAP, OF ADRIAN, MICHIGAN.

Letters Patent No. 96,770, dated November 16, 1869.

IMPROVEMENT IN POTATO-DIGGERS.

The Schedule referred to in these Letters Patent and making part of the same.

*To all whom it may concern:*

Be it known that I, JOSEPH BELKNAP, of Adrian, in the county of Lenawee, and State of Michigan, have invented a new and useful Improvement in Potato-Digger and Gatherer; and I do hereby declare that the following is a full, clear, and exact description of the construction and operation of the same, which will enable others skilled in the art to make and use my invention, reference being had to the annexed drawings, and to the letters of reference marked thereon, making a part of this specification, like letters referring to similar parts.

The nature of my invention relates to the novel construction of a cheap and yet practical hand-fork, for the purposes of digging potatoes and gathering them, and, if desirable, sorting them into large and small sizes.

To enable others skilled in the art to make and use my invention, I will now proceed to describe its construction and operation.

In the drawings—

Figure 1:
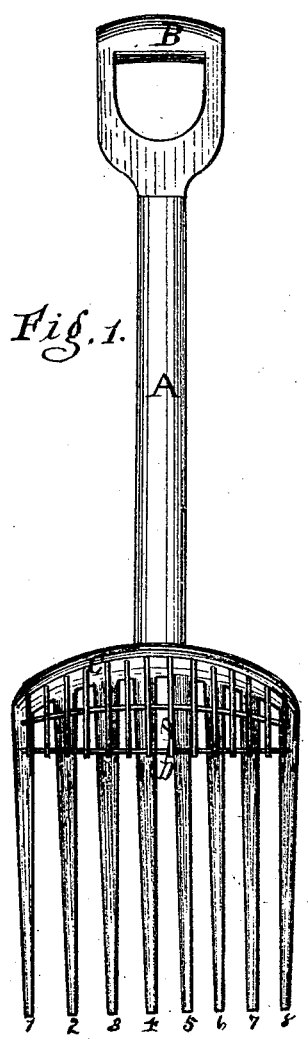
Figure 1 is a front view of my improved potato-digger and gatherer.
Figure 2:
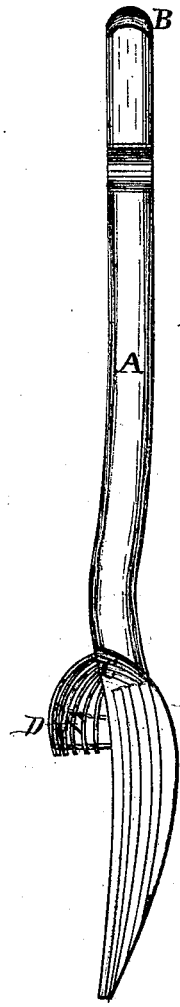
Figure 2 is an edge view of the same.

A is the shank;

B, the handle;

C, the cross-head, to support the tines 1, 2, 3, 4, 5, &c.; and

D is a net-work, covering the heel of the fork.

This instrument is designed to be used both by the hands and feet, very similar to a spade or shovel, by being thrust into the soil.

I prefer the screw D, as constructed, with its connecting-supports, to keep its tines or bars securely in their place, and its position on the digger, that is, arched forward, over the tines 1, 2, 3, &c., to any prolongation of the tines, projecting beyond and back of the supporter C, as is the case in potato-diggers heretofore in use, because, when the digger is raised from the ground, for the purpose of shaking out the soil from about the potatoes, the points of the curved tines are necessarily elevated, and the contents set back toward the handle; and were there no other guard but such as a prolongation of the tines, or similar device, the potatoes would fall off in the process of shaking, when raised above a certain elevation; but my digger catches its contents, as in a cage, however high it may be raised, for convenience in shaking, and, when shook in the air, the adhering soil is brought into contact with so many opposing points or bars of metal, that it is easily and quickly pulverized, and, falling through the tines, leaves the potatoes in the hollow of the digger.

To separate the potatoes cleanly from the soil, it is necessary to raise the digger above the ground, and shake it in the air.

Again, when the soil is hard, a potato-digger requires the united strength of foot and hand to force it under the potatoes, and any backward projection from the tine-supporter C would prevent the use of the foot, whereas my digger can, in this respect, be worked, like a spade, sufficiently back from the hill or row of potatoes to avoid cutting or piercing them with the tines, and then, by a moderate pressure of the handle downward, and a slight raising of the tines, by grasping the shank A, the potatoes are readily raised to the surface of the ground by the tines 1, 2, 3, &c., when, by a sudden shake of the fork, the earth is sifted through between the tines, and the potatoes left in the dish or hollow of the fork, formed by the bend of the tines.

D is a net-work of iron or steel wire, attached to and covering the heel of the fork, and extending downward over the upper ends of the tines, so as to form a sieve or screen dishing-cover, to serve as an extension of the dish formed by the bend of the tines.

The design of this net-work or screen D is to prevent overflowing the heel of the fork by the soil, and to assist the tines 1, 2, 3, &c., in separating the potatoes from the soil.

The meshes in the screen D should be proportionate with the spaces between the tines.

I claim, as my invention—

The arched screen or net-work D, as constructed, with connecting-supports, in combination with the curved tines 1, 2, 3, 4, tine-supporters C, and handle A, when constructed as shown, substantially as and for the purpose set forth.

JOSEPH BELKNAP.

Witnesses:
S. B. BARKER,
A. M. GUTHRIE.